United States Patent [19]

Claussen et al.

[11] Patent Number: 4,733,959

[45] Date of Patent: Mar. 29, 1988

[54] APPARATUS AND METHOD FOR TINTING HYDROPHILIC CONTACT LENSES

[75] Inventors: Eric R. Claussen; William C. Hoffman; Lawrence A. Smith, all of Denver, Colo.

[73] Assignee: Optatint, Inc., Englewood, Colo.

[21] Appl. No.: 729,457

[22] Filed: May 1, 1985

[51] Int. Cl.⁴ .................... G02C 7/04; D06P 5/00
[52] U.S. Cl. ............................. 351/177; 8/507
[58] Field of Search .............. 351/160 H, 160 R, 161, 351/162, 177; 8/507

[56] References Cited

U.S. PATENT DOCUMENTS

| 3,476,499 | 11/1969 | Wichterle | 351/162 X |
| 4,468,229 | 8/1984 | Su | 351/162 X |
| 4,518,390 | 5/1985 | Rabenau et al. | 351/162 X |

FOREIGN PATENT DOCUMENTS 1004424  9/1965  United Kingdom .............. 351/162

Primary Examiner—John K. Corbin
Assistant Examiner—Scott J. Sugarman
Attorney, Agent, or Firm—Pennie & Edmonds

[57] ABSTRACT

An apparatus and method for tinting hydrophilic contact lenses wherein a base having at least one post whose remote end is shaped for receiving and positioning a hydrophilic contact lens, and at least one cap which when placed in communication with the post and the lens masks one or more predetermined areas of the lens, is assembled with a lens positioned on the end of a post which is then capped. The assembly is immersed in a dye bath and then removed therefrom when the lens has attained the desired color, after which the assembly is placed in a fixing solution such that the lens is tinted permanently and fluid transport and oxygen permeability are unaffected.

12 Claims, 4 Drawing Figures

APPARATUS AND METHOD FOR TINTING HYDROPHILIC CONTACT LENSES

BACKGROUND OF THE INVENTION

1. Field of the Invention

The invention relates to an apparatus and method for tinting hydrophilic contact lenses. A hydrated finished lens is placed in a holding device constructed to mask areas of the lens that are not to be tinted. The holding device containing the lens is then placed in a dye bath and the lens is tinted using reactive or vat dyes. Any number of lenses can be tinted at one time.

2. Description of Related Art

Tinted contact lenses offer several advantages over clear contact lenses. Contact lenses can be tinted to enhance or even change the color of the iris, which is often desirable since contact lenses are primarily worn for cosmetic reasons. Tinting a lens can also serve as a location aid, making it easier to locate a decentered lens on the eye or to find a lens if it has been dropped, lost or misplaced. Tinted lenses reduce the annoying glare often experienced with clear lenses out of doors. There are also several therapeutic reasons to tint a lens. An opaque black lens can also be used as a sleep aid for people with sleeping problems. Lenses can be tinted to absorb ultra-violet light to prevent retinal damage after surgery. Tinted lenses also may be used to cover unsightly eye injuries. U.S. Pat. No. 3,586,423 describes a tinted lens that enables color-blind individuals to distinguish colors.

The first contact lenses made of polymethyl methacrylate (hard lenses) were tinted by dissolving or suspending dyes or pigments in the monomer or prepolymer before polymerization. Since hard lenses are small (8.0-9.0 mm diameter) the entire lens can be tinted without being visible on the sclera. Soft (hydrophilic) lenses, however, are much larger (14 mm diameter) so that the entire lens cannot be tinted without making the eye appear strange. For a tinted lens to appear normal, the tinted zone cannot be larger than the iris (11 mm diameter). Thus, soft lenses must be tinted only in the central area (11 mm diameter) and the periphery must be left clear. Some practitioners also prefer to have the center (5 mm diameter) directly over the pupil left clear.

The first tinted soft lenses were made in the early 1970's by a number of workers in the United States and Europe. Two basic techniques were used. In one, the colorant was included in the polymer itself at formulation, while the other technique applied the colorant to a finished clear lens.)

The first technique consisted of casting concentric rings of clear and tinted polymer in tubular molds. Pigments were used for coloring since water soluble dyes would extract on hydration. The resulting rods were machined into buttons and lenses using standard manufacturing techniques. After hydration and extraction, the finished lenses were ready for wear. This process had several problems that made it unattractive commercially. Incomplete bonding at the junctions of the concentric polymer rings frequently would cause lenses to tear at the junction on hydration. The expansion ratios of each zone had to match exactly or buckling would occur at the junctions on hydration. Pigments also have a large enough particle size to cause a decrease in fluid transport and thus decreases oxygen permeability.

The second technique applied oil-soluble dyes to a finished lens swollen in an organic solvent. Solvents used were miscible in water and organic solvents, for example: methanol, ethanol, dimethyl sulfoxide, dimethyl formamide, and tetrahydrofuran. In a typical protocol, a finished, hydrated soft lens would be placed in a swelling solvent until maximum expansion was achieved. The expanded lens was then placed on a template machined from an aluminum or brass block. The metal template was designed with exchangable masking dies that allowed for the tinting solution to be applied only to selected areas of the lens. A solution of an oil-soluble dye in the swelling solvent was then applied and allowed to diffuse into the lens matrix. After the desired color was achieved, excess dye was poured off, the lens was rinsed with solvent, and then reequilibrated in normal saline solution. The exchange from organic to aqueous solvent caused the dye to precipitate in the lens matrix since the dye would be insoluble in water.

This process has several serious problems that prevented it from being commercially viable. The expansion step is a very destructive process since it breaks the crosslinks that hold the polymer matrix together thus decreasing the already low durability of a lens. In the expanded state, the lens is very fragile and is easily damaged in handling, particularly when the masking die is placed over the lens on the template. The dyes themselves are prone to leaching from the lens since there is nothing holding the dyes in the matrix. The swelling solvents, which are toxic to ocular tissue, must be completely extracted from the lens on re-equilibration. The process itself is slow and not adaptable to volume production required to make it commercially successful.

There are two modifications of this second process in use today. All have in common a masking device to cover areas of a lens not to be tinted. All are one-at-a-time processes in that each lens is dyed individually. The process can be automated by placing the lens holders on a conveyor and injecting and removing dying, fixing, and rinsing solutions as the holders move along the line.

In the first modification, a vat dye is used as the colorant. The dye is applied in its soluble reduced form to the hydrated lens. After the dye has been absorbed into the lens, it is oxidized to its insoluble form. This traps the precipitated colorant in the polymer matrix. This is an improvement over the use of oil-soluble dyes since the lens does not have to be expanded in solvent. It has a similar problem, however, since the dyes are prone to leaching since there is nothing holding the dye in the matrix.

In the second modification, reactive dyes are used as colorants. The dye is applied in the same manner as a vat dye but is activated to cause it to chemically bond to the lens surface. This is an improvement since the colorant is permanent and will not leach from the lens.

Both modifications are still one lens at a time processes that have been automated. They are subject to mechanical breakdown and require considerable capital expense in set-up. They are not true bulk processes and offer little flexibility in production.

Other methods of tinting soft contact lenses include that described in British patent specification 1,004,424, dated May 31, 1963 which describes contact lenses made of a synthetic hydrocolloidal polymer which is at least partly colored by using a dye bath and a masking device. Also, British patent specification No. 1,163,617, dated Nov. 11, 1966 discloses a colored contact lens wherein a single-colored or multi-colored pattern is provided between at least two layers of a physiologically suitable hydrogel of which at least the first layer on a convex surface is transparent.

A recent method is that of U.S. Pat. No. 4,468,229, which discloses the covalent bonding of reactive dyestuffs to monomer units of the polymer backbone of polymeric lens material.

Accordingly, it is an the object of the present invention to provide an apparatus and a method for tinting soft contact lenses which offer the flexibility of creating any tinting pattern on any lens design and which is capable of tinting one or more lenses in a single operation.

These and other objects can be appreciated by reference to the following description of the invention and its preferred embodiments.

SUMMARY OF THE INVENTION

The foregoing objects are achieved according to the present invention wherein a conveniently small masking device, which can be either disposable or reusable, is used to hold the lens and mask the areas that are not to be tinted. The device is preferably made from a clear, non-reactive engineering plastic (e.g., polycarbonate) and can be made in any configuration to accomodate different lenses and to tint them in any pattern. A stop is incorporated into the design to prevent lens damage when the device is assembled. The device is small in size so that the entire assembly containing the lens can be placed in the dye bath for tinting. The design of the device permits any number of lenses to be tinted at one time in a batch or bulk process. The device is preferably clear so that lenses can be observed when carrying out the method in order to aid in color matching. The device can be made to hold a pair of lenses so that they can be tinted at the same time to assure a perfect color match.

The preferred colorants are the reactive dyes. When properly applied, the tints are permanent; fluid transport and oxygen permeability remain unaffected. A further benefit is that a lens can be pre-checked with the dye before activation to see how it will tint. This is particularly valuable in tinting specialty designs such as toric and aphakic lenses.

DETAILED DESCRIPTION OF THE INVENTION

Apparatus Used in Tinting Method

Figure 1:
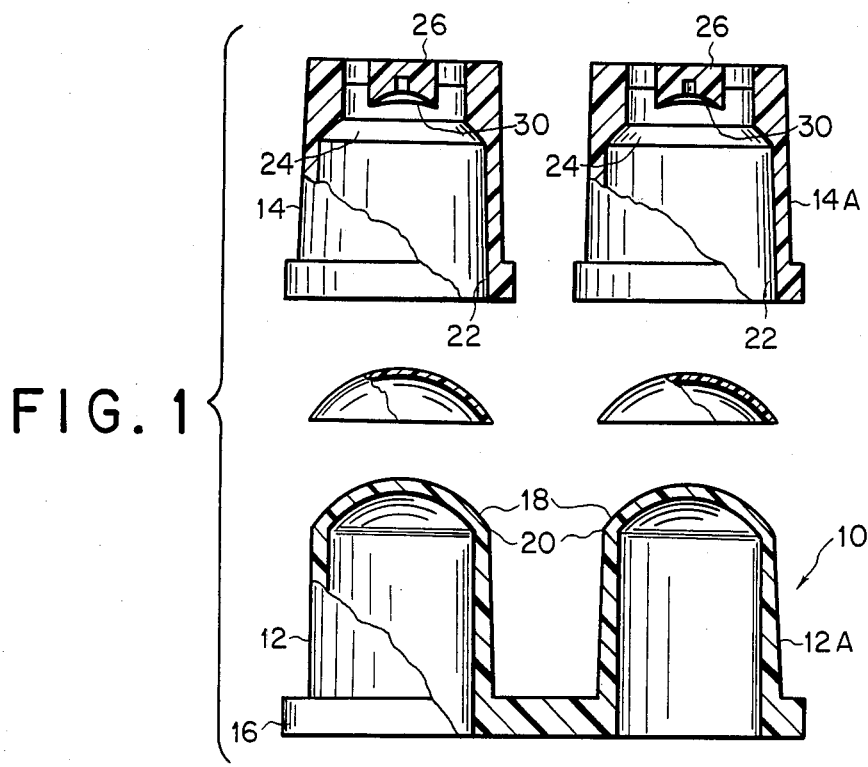
FIG. 1 is an exploded elevation in partial cross-sectional of the apparatus of the invention.
Figure 4:
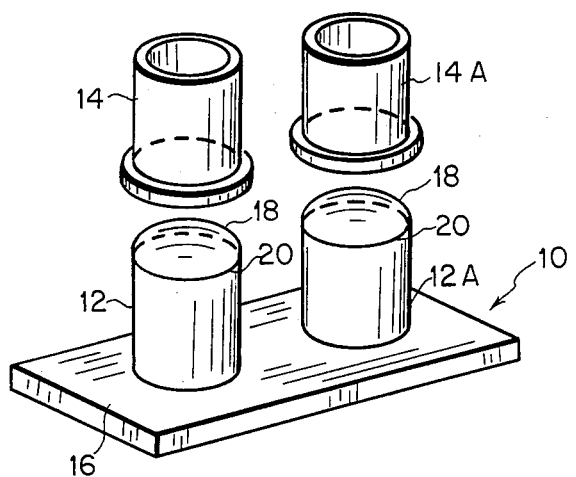
FIG. 4 is an exploded perspective view of the apparatus of the invention.

As shown in FIGS. 1 and 4, the masking apparatus comprises a base member 10 with a pair of upstanding posts 12, 12A and a pair of caps 14, 14A. The base has a substantially planar lower portion 16 which has secured or integrally molded to it a pair of posts 12, 12A. The planar portion is approximately 45 mm long, 20 mm wide and has a thickness of approximately 3 mm. the posts 12, 12A are cylindrical in shape and have diameter of 16.0 mm which is sufficient for tinting any of the common contact lens sizes. The top end 18 of the posts is a dome shape of constant radius which matches the base curve for the contact lenses to be tinted. A dome radius of 8.6 mm is sufficient for the great majority of contact lenses. The diameter of the circle 20 formed where the dome 18 meets the cylindrical outer surface of the post is slightly greater than the diameter of the lens to be tinted.

The caps 14, 14A shown in FIG. 1 provide the actual masking function. Therefore, it is the configuration of the cap that determines the ultimate configuration of the tinting on the lens. The caps 14, 14A have a substantially cylindrical inside surface 22 that matches the cylindrical portion of the posts. The caps 14, 14A have one end that is completely open so the caps 14, 14A may fit over and receive the posts 12, 12A. At the opposite end there is the masking portion to provide a centrally tinted lens with a clear annular ring, then the cap has an annular surface 24 with a curved cross-section. The radius of curvature of the annular surface 24 is the same as the radius of curvature of the dome portion 18 of the mating post. If a clear central portion is desired, then a post 26 is centered and held by supports 28. The surface 30 of the post 26 concave and has a radius of curvature the same as the dome portion 18 of the mating post.

Figure 2:
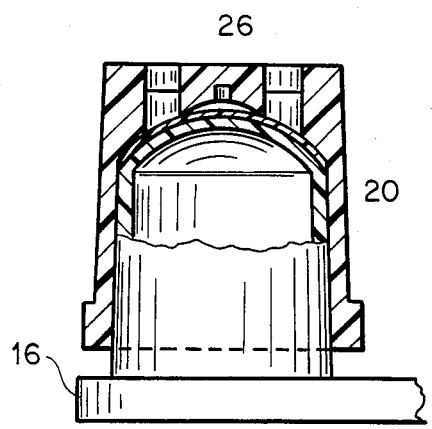
FIG. 2 is an elevation in partial cross-section of one post and cap as used in the apparatus and method of the invention.
Figure 3:
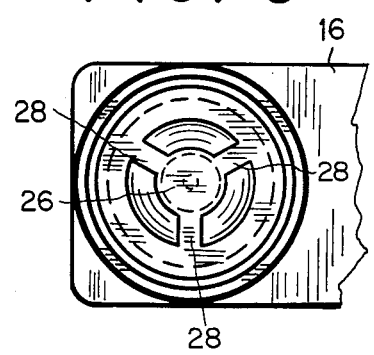
FIG. 3 is a top view of a post and cap assembly according to the apparatus and method of the invention.

In use, a lens is centered on the dome portion 18 of the post 12, 12A as shown in FIGS. 2 and 3. The cap 14, 14A is then placed over and receives the mating base post. The cap fits snugly over the post and is in interference fit with the base. The cap and post are in close tolerance interference fit and hold together by friction and they taper only slightly to allow easy assembly but not so much as to prevent the friction fit. The cap fits such that the annular surface 24 is in face-to-face contact with the contact lens around the outer annular portion to be left untinted. The masking portion of the cap is flush with the lens or it may protrude slightly into the lens. In the preferred embodiment the annular surface 24 covers a portion of the lens such that a circular portion of 11 mm is left exposed. This corresponds to the size of the average iris. The center masking post 26 has its concave surface 30 in face-to-face contact with the central portion of the contact lens. The central post 26 is 5 mm in diameter and allows a circular portion of the contact lens to remain clear. For standard lenses the center post 26 extends 0.02 mm into the lens; for super thin lenses the post extends 0.04 mm into the lens. When assembling the unit, care must be taken so as not to force the cap onto the post and thereby damage the lens.

The cap 14, 14A may be modified in several ways. If no center post 26 is present, then a contact with the complete center tinted will be produced. The annular surface 24 can be larger such that it leaves only a circular portion 5 mm in diameter tinted. A small aperture may be created through annular ring 24; this will allow a small point to be tinted in the outer clear ring. The point is then used as a reference for determining lens orientation when it is placed on the eye.

The apparatus can be fabricated by injection molding of any suitable substance, preferably a clear non-reactive engineering plastic such as polycarbonate.

Process for Tinting Lenses

Hydrophilic contact lenses are placed in the apparatus described above. The types of lenses which can be used include but are not limited to those made of the following substances: poly-2-hydroxyethyl methacrylate; copolymers of poly-2-hydroxyethyl methacrylate and other monomers including diacetone acrylamide and N-vinyl-2-pyrrolidone; or combinations of polyglyceryl methacrylate, N-vinyl-2-pyrrolidone, and methyl methacrylate.

The apparatus is then capped and immersed in an activated dye solution. Reactive or vat dyes can be used. Suitable reactive dyes include but are not limited to reactive black 5, reactive blue 21, reactive orange 78, reactive dyes such as, but not limited to, the combination of reactive blue 21 and reactive yellow 15. An example of a suitable vat dye is vat blue 6. The dye solution is preferably kept at an elevated temperature, e.g., 60° C. However, the process can be performed at temperatures, as low as 40° C. with satisfactory results. The lens-containing apparatus is kept in the dye solution for a time sufficient until the desired color is taken on by the lens.

The apparatus is then removed from the dye solution and placed in a fixing solution. The choice of fixing solution to be used is determined by the dye which had been used for the tinting. Suitable fixing solutions include sodium carbonate solutions for the reactive dyes and hydrogen peroxide solutions for the vat dyes. The lens-containing apparatus is removed from the fixing solution after an appropriate time for the colorant to be fixed permanently to the lens.

The lens is then removed from the apparatus, cleaned with a mild surfactant, and re-equilibrated in normal saline solution. The lens is ascepticized and then fitted to a patient.

DESCRIPTION OF THE PREFERRED EMBODIMENTS

Example 1: A Disposable Masking Device

A disposable masking device was injection molded from medical grade hi-density polyethylene with the following dimensions: base unit post diameter 14.5 mm, post radius of curvature 8.6 mm, cap diameter 14.5 mm, cap radius of curvature 8.6 mm, outer masking diameter 11.0 mm, inner masking diameter 5.0 mm. A standard spherical lathe cut polymacon (poly-2-hydroxyethyl methacrylate) lens (with the following parameters: base curve 8.6 mm, diameter 14.0 mm, power −3.0 D) was placed on the base unit post and the cap fit over the post. 20 ml of a 5% by weight solution of [2,7-naphthalenedisulfonic acid, 4-amino-5-hydroxy-3,6-bis((4-((2-(sulfooxy)ethyl)sulfonyl)-phenyl)azo]-tetrasodium salt (reactive black 5), in 0.85 ml sodium chloride was prepared. This dye solution was filtered and added to 80 ml of 0.2 M sodium carbonate solution to activate the dye. The assembled masking device containing the lens was placed in the activated dye bath. After 20 minutes, the device was removed from the dye bath and placed in a volume 0.2 M sodium carbonate solution to fix the dye. After 30 minutes, the masking device was removed from the fixing bath and disassembled. The lens had been tinted a medium blue shade, 11 mm in diameter with a 5 mm clear center. The lens was then cleaned with a mild surfactant and re-equilibrated in normal saline solution for one hour. The lens was ascepticized according to the lens manufacturer's instructions and then fitted to the patient. The patient's light gray-blue eyes appeared a medium blue with the tinted lens. The disposable masking device was not reused.

Example 2: A Reusable Masking Device

A reusable masking device was injection molded from medical grade polycarbonate resin with the same dimensions as Example 1. A standard spherical spin-cast polymacon (poly-2-hydroxyethyl methacrylate) lens (with the following parameters: base curve 8.9 mm, diameter 14.5 mm, power −1.25 D) was placed on the base unit post and the cap fit over the post. 20 ml of a 5% by weight solution of copper, [29 H,31H-phthalocyaninato(2-)-N(29),N(30),N(31),N(32)]-sulfo(4-((2-sulfooxy)ethyl)sulfonyl)phenyl)amino)sulfonyl derivatives (reactive blue 21), in 0.85 M sodium chloride was prepared. This dye solution was filtered, added to 80 ml of 0.2 M sodium carbonate solution, and heated to 60° C. to activate the dye. The assembled masking device containing the lens was placed in the hot dye bath. After five minutes, the device was removed from the dye and placed in a volume of 0.2 M sodium carbonate solution also at 60° C. After 30 minutes the device was removed and disassembled. The lens had been tinted a medium aqua shade. After cleaning, re-equlibration, and asepticization, the lens was ready for wear. A light blue eye appeared greenish blue with the lens. This device made of polycarbonate could be reused several times.

Example 3: A Device to Tint the Entire Center of the Lens

A reusable masking device was injection molded from medical grade polycarbonate resin with the following parameters: base unit post diameter 16.0 mm, post radius of curvature 9.3 mm, cap diameter 16.0 mm, cap radius of curvature 9.3 mm, outer masking diameter 11.0 mm, and no inner post. A standard spherical lathe cut polymacon (poly-2-hydroxyethyl methacrylate) lens (with the following parameters: base curve 9.3 mm, diameter 14.8 mm, power −2.5 D) was placed on the base unit post and the cap was fit over the post. 20 ml of a 5% by weight solution of [2-naphthalenesulfonic acid,7-(acetylamino)-4-hydroxyl-3-((4-((2-(sulfooxy)-ethyl)sulfonyl)phenyl)azo)-],(reactive orange 78), in 0.85 M sodium chloride was prepared. The procedure of Example 2 was repeated. The lens had been tinted an orangebrown shade. The area tinted was the entire center of the lens to a 11 mm diameter. A light blue eye appears brown with this lens. Example 4: A Device to Tint an Ultra-Thin Lens A reuseable masking device was injection molded from medical grade polycarbonate resin with the same dimensions as Example 1 except that the center post on the cap extended +0.02 mm into the lens. A spherical spin-cast ultra-thin polymacon (poly-2-hydroxyethyl methacrylate) lens (with the following parameters: base curve 8.6 mm, diameter 14.5 mm, power −4.00 D, center thickness 0.04 mm) was placed on the base unit post and the cap was fit over the post. 20 ml of a 5% by weight solution of [benzene sulfonic acid, 4-(4,5-dihydro-4-((2-methoxy-5-methyl-4-((2-(sulfooxy)ethyl)sulfonyl)phenyl)azo)-3-methyl-5-oxo-1H-pyrazol-1-yl)-],(reactive yellow 15), in 0.85 M sodium chloride was prepared. The procedure of Example 2 was repeated. The lens was tinted a yellow shade. The pupil area of the lens was clear. A light blue eye appears greenish with this lens.

If the ultra-thin lens tends to pull out of the masking device in the hot bath, an alternate method may be used. In this method, the hot dye solution is placed in the top of the masking device instead of placing the entire masking device in the dye bath. The rest of the procedure remains the same.

Example 5: Tinting Lenses with Vat Dyes

The masking device described in Example 2 was used. A standard spherical lathe cut polymacon (poly-2-hydroxyethyl methacrylate) lens (with the following parameters: base curve 8.6 mm, diameter 14.5 mm, power −2.50 D) was placed on the base unit post and the cap was fit over the post. A solution of 0.15 g 7,16-dichloro-6,15-dihydro-5,9,14,18-anthrazine tetrone (vat blue 6) in 10 ml water, 50 ml of 3% sodium dithionite and 50 ml of 5% sodium hydroxide solution was prepared, heated to 65° C. and filtered. The masking device holding the lens was then placed in the hot solution. After ten minutes the masking device was removed and placed in a 10% hydrogen peroxide solution at 60° C. for 15 minutes. The lens was removed from the masking device, cleaned with a mild surfactant, and re-equilibrated in normal saline solution for one hour. The lens had been tinted a medium blue shade. After asepticization the lens was fitted on the patient. A light blue eye appeared a brighter blue with the tinted lens.

Example 6: Tinting A Modified Poly-2-Hydroxethyl Methacrylate Lens

A reusable masking device was injection molded from medical grade polycarbonate resin with the same dimensions as Example 1. A spherical bufilcon A (poly-2-hydroxyethyl methacrylate with diacetone acrylamide) lens (with the following parameters: base curve 8.9 mm, diameter 14.5 mm, power −2.50 D) was placed on the base unit post and the cap was fit over the post. twenty milliliters of a 3% by weight solution of 2-anthracenesulfonic acid, 1-amino-9,10-dihydro9,10-dioxo -4-((3-((2-(sulfooxy)ethyl)sulfonyl)phenyl) amino)-, disodium salt (reactive blue 19) in 0.85 M sodium chloride was prepared. The procedure of Example 2 was repeated. The lens was tinted a medium blue shade. A light blue eye appears brighter blue with this lens.

Example 7: Tinting A Non-Hema Lens

The procedure of Example 2 was repeated with a spherical crofilcon A (poly-glyceryl methacrylate with methyl methacrylate) lens with the following parameters: base curve 8.6 mm, diameter 13.8 mm, and power −6.0 D. The lens was tinted an aqua shade. A light blue eye appeared bright blue with this lens.

Example 8: Mixing Dyes for Custom Tinting of Lens

The procedure of Example 2 was repeated with a polymacon lens. The dye bath was a mixture of five parts reactive blue 21 and one part reactive yellow 15. The resulting lens was a medium green color. A light blue eye appears green with this lens.

Example 9: Preparing A Color-Correcting Lens

The procedure of Example 3 was repeated with a polymacon lens. The dye bath was prepared from a 5% solution of reactive red 94. The resulting lens was a medium red in color. Such a lens can be used as a visual aid for color correction in color-blind persons as taught in U.S. Pat. No. 3,586,423.

Example 10: A Device to Prepare Occluder Lenses

A reusable masking device was injection molded from medical grade polycarbonate resin with the following dimensions: base unit post diameter 16.0 mm, post radius of curvature 8.9 mm, cap diameter 16.0 mm, cap radius of curvature 8.9 mm, outer masking diameter 5 mm with no inner post. This masking device exposes only a 5 mm zone in the center of a lens to the dye bath. A standard polymacon lens was fitted in the masking device. A dye bath was prepared from a 5% solution of reactive black 5. The lens was placed in the bath at 60° C. for 30 minutes. Work-up was the same as previous examples. The lens appeared clear with an opaque black center. This type of lens is useful as a cosmetic lens for people with eye injuries or as a patch that blocks light from entering the eye.

Example 11: Tinting Toric and Bifocal Lenses

Toric and bifocal soft lenses are spherical on one side and aspheric on the opposite side. To tint these lenses, the spherical side must be placed against the base unit post, otherwise the lens will fold and not tint uniformly. Back surface torics will have to be inverted to be tinted. A front surface torix Hefilcon B (poly-HEMA with n-vinyl-2-pyrrolidone) lens (with the following parameters: base curve 8.3 mm, diameter 14.5 mm, and power −2.0 D,1.0 Dx75) was tinted as in Example 3 with reactive blue 21. The resultant lens was uniformly tinted a light blue color.

Example 12: Modifying The Device to Aid in Determining Lens Rotation

The masking device can be further modified by drilling a small hole (0.01 mm) in the outer masked area. This will provide a small dot on the periphery of the lens that will aid the lens fitter in determining lens rotation.

The preceding Examples are given for purposes of illustration and not by way of limitation on the scope of the invention.

We claim:

1. A method for tinting hydrophilic contact lenses, comprising the steps of:
   (a) placing a lens within an apparatus comprising a base having at least one post whose remote end is shaped for receiving and positioning the lens, and at least one cap which when placed in communication with the post and the lens, masks one or more predetermined areas of the lens;
   (b) placing the cap in communication with the post and the lens;
   (c) immersing the lens-containing apparatus in an activated dye solution bath containing one or more dyes;
   (d) removing the lens-containing apparatus from the dye solution bath after the lens has attained the desired color; and
   (e) placing the lens-containing apparatus in a fixing solution wherein the lens is tinted permanently.

2. The method according to claim 1 wherein the dye solution bath comprises a reactive dye.

3. The method according to claim 1 wherein the dye solution bath comprises a vat dye.

4. The method according to claim 1 wherein the fixing solution is a sodium carbonate solution.

5. The method according to claim 4 wherein the sodium carbonate solution has a concentration of 0.2 M.

6. The method according to claim 1 wherein the fixing solution is an aqueous hydrogen peroxide solution.

7. The method according to claim 6 wherein the hydrogen peroxide solution has a concentration of 10%.

8. The method according to claim 1 wherein the lens is toric.

9. The method according to claim 1 wherein the lens is bifocal.

10. The method according to claim 1 wherein only the center zone of the lens is exposed to the dye solution bath.

11. method according to claim 1 wherein step (c) is carried out at elevated temperatures.

12. A method for tinting hydrophilic contact lenses, comprising the steps of:
(a) placing a lens within an apparatus comprising a base having at least one post whose remote end is shaped for receiving and positioning the lens, and at least one cap which when placed in communication with the post and the lens, masks one or more predetermined areas of the lens;
(b) repeating step (a) at least one time;
(c) placing the cap in communication with the post and the lens;
(d) immersing at least two lens-containing apparatuses in an activated dye solution bath containing one or more dyes;
(e) removing the lens-containing apparatuses from the dye solution bath after the lense have obtained the desired color; and
(f) placing the lens-containing apparatuses in a fixing solution wherein the lenses are tinted permanently.

* * * * *

UNITED STATES PATENT AND TRADEMARK OFFICE
CERTIFICATE OF CORRECTION

PATENT NO. : 4,733,959

DATED : March 29, 1988

INVENTOR(S) : Eric R. Claussen; William C. Hoffman; Lawrence A. Smith

It is certified that error appears in the above-identified patent and that said Letters Patent is hereby corrected as shown below:

Col. 6, Line 47, "appears brown with this lens. Example 4: A device to" should read -- appears brown with this lens.

Col. 6, Line 48, "Tint an Ultra-Thin Lens" should read -- Example 4: A device to Tint an Ultra-Thin Lens.*

Signed and Sealed this

Thirtieth Day of August, 1988

Attest:

DONALD J. QUIGG

Attesting Officer      Commissioner of Patents and Trademarks